United States Patent
Kim et al.

(10) Patent No.: US 10,313,082 B2
(45) Date of Patent: Jun. 4, 2019

(54) METHOD FOR TRANSMITTING AND RECEIVING ACKNOWLEDGMENT/NEGATIVE-ACKNOWLEDGMENT SIGNAL FOR UPLINK MULTI-USER DATA IN WIRELESS LAN SYSTEM AND APPARATUS THEREFOR

(71) Applicant: LG ELECTRONICS INC., Seoul (KR)

(72) Inventors: Jeongki Kim, Seoul (KR); Kiseon Ryu, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/522,727

(22) PCT Filed: Oct. 27, 2015

(86) PCT No.: PCT/KR2015/011366
§ 371 (c)(1),
(2) Date: Apr. 27, 2017

(87) PCT Pub. No.: WO2016/068571
PCT Pub. Date: May 6, 2016

(65) Prior Publication Data
US 2017/0338931 A1    Nov. 23, 2017

Related U.S. Application Data

(60) Provisional application No. 62/068,771, filed on Oct. 27, 2014, provisional application No. 62/100,915, (Continued)

(51) Int. Cl.
*H04L 5/00* (2006.01)
*H04L 1/16* (2006.01)
*H04W 84/12* (2009.01)

(52) U.S. Cl.
CPC .............. *H04L 5/0055* (2013.01); *H04L 1/16* (2013.01); *H04L 5/005* (2013.01); *H04W 84/12* (2013.01)

(58) Field of Classification Search
CPC ......... H04L 5/0055; H04L 1/16; H04W 82/12
See application file for complete search history.

(56) References Cited

U.S. PATENT DOCUMENTS

| | | |
|---|---|---|
| 2010/0165973 A1 | 7/2010 | Su et al. |
| 2011/0096710 A1 | 4/2011 | Liu et al. |

(Continued)

FOREIGN PATENT DOCUMENTS

| | | |
|---|---|---|
| KR | 1020110095098 | 8/2011 |
| WO | 2013157787 | 10/2013 |

OTHER PUBLICATIONS

PCT International Application No. PCT/KR2015/011366, Written Opinion of the International Searching Authority dated Mar. 31, 2016, 17 pages.

*Primary Examiner* — Rhonda L Murphy
(74) *Attorney, Agent, or Firm* — Lee Hong Degerman Kang & Waimey

(57) ABSTRACT

The present document relates to a method for transmitting an acknowledgment/negative-acknowledgment (ACK/NACK) signal for data transmitted from a plurality of stations (STAs) by an access point (AP) in a wireless LAN (WLAN) system and an apparatus therefor. To this end, the AP transmits a trigger frame to the plurality of STAs, receives data transmitted from the plurality of STAs in response to the trigger frame, and transmits and ACK/ANCK signal for the data received from the plurality of STAs. In this process, when all the data received from the plurality of STAs have (Continued)

been successfully received, the ACK/NACK signal may be transmitted not using a block ACK frame but using an ACK frame.

6 Claims, 20 Drawing Sheets

Related U.S. Application Data filed on Jan. 8, 2015, provisional application No. 62/109,623, filed on Jan. 30, 2015, provisional application No. 62/110,611, filed on Feb. 2, 2015, provisional application No. 62/111,021, filed on Feb. 2, 2015, provisional application No. 62/111,117, filed on Feb. 3, 2015, provisional application No. 62/112,600, filed on Feb. 5, 2015, provisional application No. 62/185,741, filed on Jun. 29, 2015.

(56) References Cited

U.S. PATENT DOCUMENTS

| | | |
|---|---|---|
| 2011/0235593 A1 | 9/2011 | Gong et al. |
| 2013/0301569 A1* | 11/2013 | Wang .................... H04L 5/0055 370/329 |
| 2014/0314004 A1* | 10/2014 | Zhou ..................... H04L 5/0055 370/329 |
| 2018/0076860 A1* | 3/2018 | Chu .................. H04W 72/1289 |

* cited by examiner

| B0 | B1 | B2 | B3 | B4 | B5 | B6 B11 | B12 B15 |
|---|---|---|---|---|---|---|---|
| BA ACK Policy | Multi-TID | Compressed Bitmp | GCR | Multi-AID | Group ACK indication | Reserved | TID_INFO |

Bits:  1    1    1    1    1    1    7    4

20MHz ▯ ▯ ▯ Dup ▯ ▯ , 1x symbol

Octets:                                         2                8

| ACK/NACK type (10) | STA Bitmap length | STA Bitmap | Block ACK Starting Sequence Control | Block Ack Bitmap |
|---|---|---|---|---|

Repeat for each STA

METHOD FOR TRANSMITTING AND RECEIVING ACKNOWLEDGMENT/NEGATIVE-ACKNOWLEDGMENT SIGNAL FOR UPLINK MULTI-USER DATA IN WIRELESS LAN SYSTEM AND APPARATUS THEREFOR

CROSS-REFERENCE TO RELATED APPLICATIONS

This application is the National Stage filing under 35 U.S.C. 371 of International Application No. PCT/KR2015/011366, filed on Oct. 27, 2015, which claims the benefit of U.S. Provisional Application No. 62/068,771, filed on Oct. 27, 2014, 62/100,915, filed on Jan. 8, 2015, 62/109,623, filed on Jan. 30, 2015, 62/110,611, filed on Feb. 2, 2015, 62/111,021, filed on Feb. 2, 2015, 62/111,117, filed on Feb. 3, 2015, 62/112,600, filed on Feb. 5, 2015 and 62/185,741, filed on Jun. 29, 2015, the contents of which are all hereby incorporated by reference herein in their entirety.

TECHNICAL FIELD

The following description relates to a method for transmitting and receiving an acknowledgment/negative-acknowledgment signal for a plurality of users or a plurality of stations (STAs) in a wireless LAN system and an apparatus therefor.

BACKGROUND ART

Standards for a Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DISCLOSURE

Technical Problem

In the IEEE 802.11ax standards, an Uplink (UL) Orthogonal Frequency Division Multiple Access (OFDMA) transmission scheme and a UL Multi-User (MU) transmission scheme will be used. Then, an Access Point (AP) may receive UL MU frames from a plurality of STAs at the same transmission opportunity and needs to transmit an Acknowledgement (ACK) frame in response to the UL MU frames.

In this case, efficient transmission of an ACK signal to a plurality of STAs through a Block ACK (BA) frame may be considered. However, overhead may be problematic due to an increased size of an MU BA frame for a plurality of STAs.

Hereinafter, a method and an apparatus for efficiently transmitting an acknowledgement/negative-acknowledgment signal by minimizing overhead in a UL MU transmission situation.

Technical Solution

In an aspect of the present invention, a method of transmitting, by an access point (AP), an ACK/NACK signal for data transmitted from a plurality of stations (STAs) in a wireless LAN (WLAN) system includes: transmitting a trigger frame to the plurality of STAs; receiving data transmitted from the plurality of STAs in response to the trigger frame; and transmitting an ACK/NACL signal for the data received from the plurality of STAs, wherein, when all the data received from the plurality of STAs have been successfully received, the ACK/NACK signal is transmitted using an ACK frame instead of a block ACK frame.

The ACK frame may include Group ACK indication or All ACK indication indicating ACK for all data of uplink multi-user frames received through resources indicated by the trigger frame.

The Group ACK indication or All ACK indication may indicate, through a first value, that the ACK frame carries ACK for all data of the uplink frames received through the resources indicated by the trigger frame and indicate, through a second value, that the ACK frame carries an ACK/NACK signal for uplink data other than the uplink frames received through the resources indicated by the trigger frame.

When all uplink data received from STAs in a first group for which ACK policy has been set to a first value among the plurality of STAs have been successfully received, an ACK/NACK signal for all uplink data received from the STAs of the first group may be transmitted through an ACK frame including Group ACK indication or All ACK indication.

An ACK/NACK signal for uplink data received from STAs in a second group for which the ACK policy has been set to a second value among the plurality of STAs may be transmitted after an ACK/NACK signal request signal is received from the STAs of the second group.

The Group ACK indication or All ACK indication may indicate successful reception of all uplink data from one or more STAs for which the ACK policy has been set to the first value.

The ACK frame other than the block ACK frame may have an NDP frame format.

In another aspect of the present invention, a method of receiving, by a first station (STA), an ACK/NACK signal for transmitted data from an access point (AP) in a WLAN system includes: receiving a trigger frame transmitted to a plurality of STAs including the first STA; transmitting a plurality of data to the AP through an uplink multi-user scheme or an OFDMA scheme in response to the trigger frame; and receiving an ACK/NACK signal for the plurality of data from the AP, wherein, when the ACK/NACK signal is received using a single ACK frame instead of a block ACK frame, the data is considered to have been successfully received.

The ACK frame may include Group ACK indication or All ACK indication indicating ACK for all data of uplink multi-user frames received through resources indicated by the trigger frame.

When the first STA sets ACK policy to a first value, transmits data and receives an ACK frame in which Group ACK indication or All ACK indication has a specific value, the ACK frame may be regarded as an ACK/NACK signal for all uplink data transmitted by the first STA.

In another aspect of the present invention, an access point (AP) apparatus for transmitting an ACK/NACK signal for data transmitted from a plurality of stations (STAs) in a WLAN system includes: a transceiver configured to transmit a trigger frame to the plurality of STAs, to receive data transmitted from the plurality of STAs in response to the trigger frame and to transmit an ACK/NACK signal for the data received from the plurality of STAs; and a processor connected to the transceiver and configured to process the trigger frame, the received data and the ACK/NACK signal, wherein the processor is configured to transmit the ACK/NACK signal using an ACK frame instead of a block ACK frame when all the data received from the plurality of STAs have been successfully received.

The processor may be configured such that the ACK frame includes Group ACK indication or All ACK indication indicating ACK for all data of uplink multi-user frames received through resources indicated by the trigger frame.

An apparatus operating as a first STA for receiving an ACK/NACK signal for transmitted data from an access point (AP) in a WLAN system includes: a transceiver configured to receive a trigger frame transmitted to a plurality of STAs including the first STA, to transmit a plurality of data to the AP through an uplink multi-user scheme or an OFDMA scheme in response to the trigger frame and to receive an ACK/NACK signal for the data from the AP; and a processor connected to the transceiver and configured to process the trigger frame, the transmitted data and the ACK/NACK signal, wherein the processor considers the data to be successfully received when the ACK/NACK signal is received using a single ACK frame instead of a block ACK frame.

The ACK frame may include Group ACK indication or All ACK indication indicating ACK for all data of uplink multi-user frames received through resources indicated by the trigger frame.

Advantageous Effects

According to the present invention as described above, an AP can efficiently transmit an ACK signal to a plurality of STAs by minimizing overhead in a UL MU transmission situation.

BEST MODE

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, the following description relates to a method for efficiently utilizing a channel having a wide bandwidth in a WLAN system and an apparatus therefor. To this end, a WLAN system to which the present invention is applicable will be described first in detail.

Figure 1:
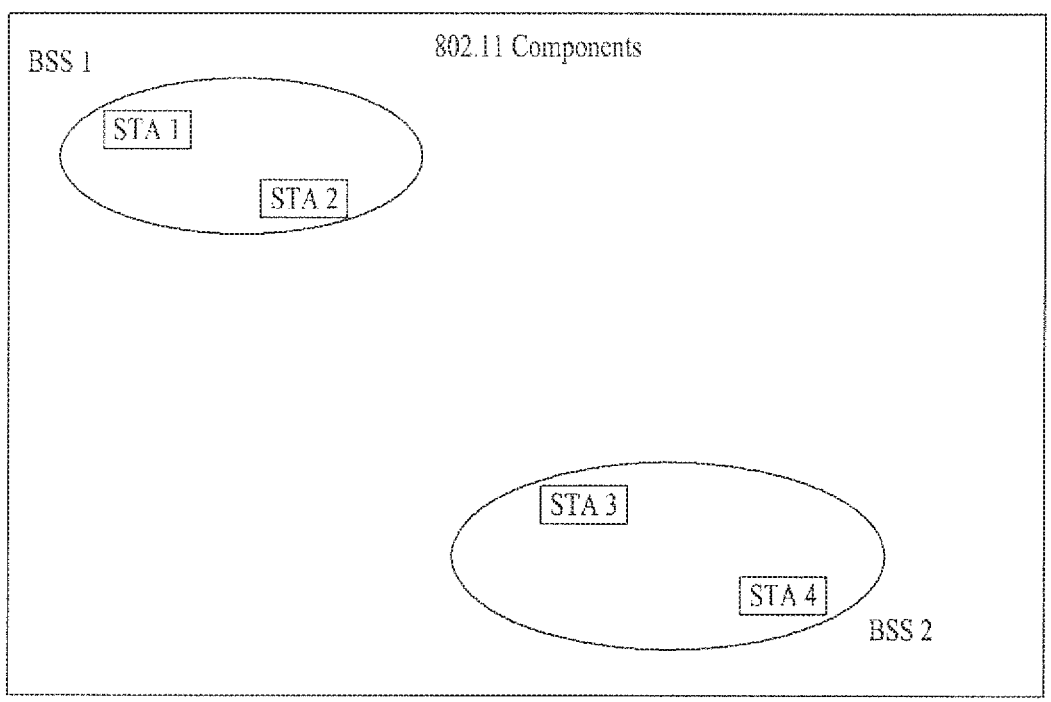
FIG. 1 is a diagram illustrating an exemplary configuration of a WLAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBS S).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
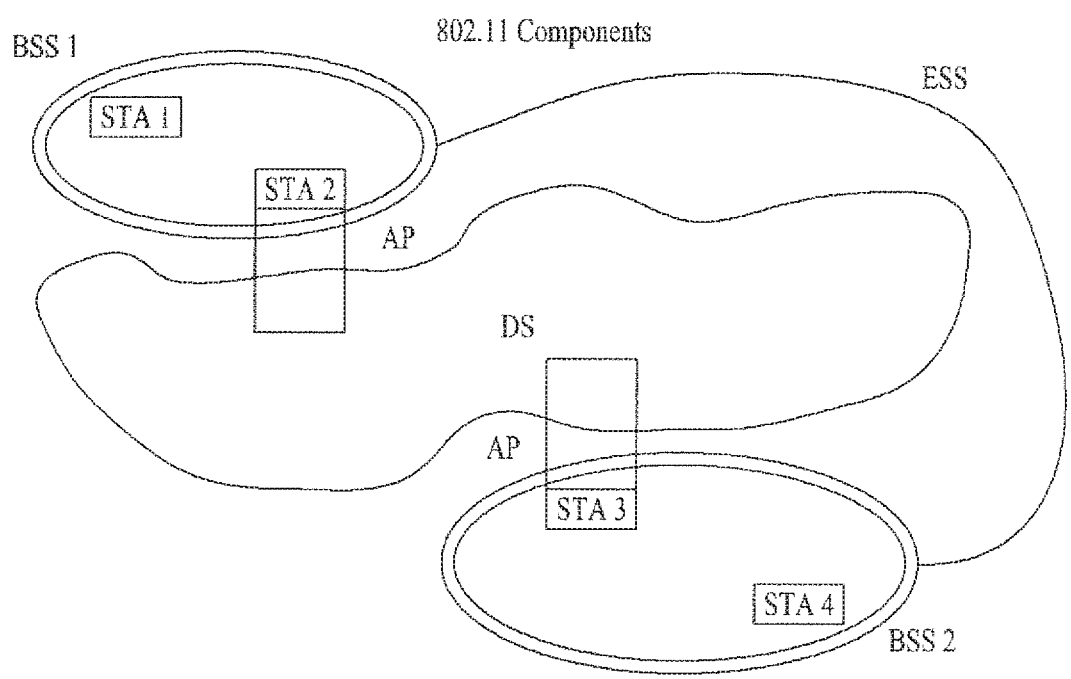
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Based on the above description, a block ACK scheme in a WLAN system will be described hereinbelow.

A block ACK mechanism is a scheme of improving channel efficiency by aggregating and then transmitting a plurality of ACKs in one frame. There are two types of block ACK mechanism schemes: an immediate ACK scheme and a delayed ACK scheme. The immediate ACK scheme may be suitable for high-bandwidth, low-latency traffic transmission, whereas the delayed ACK scheme is favorable for applications that can tolerate latency. Unless particularly specified otherwise in the below description, an STA that transmits data using the block ACK mechanism is referred to as an originator and an STA that receives the data using the block ACK mechanism is referred to as a recipient.

Figure 3:
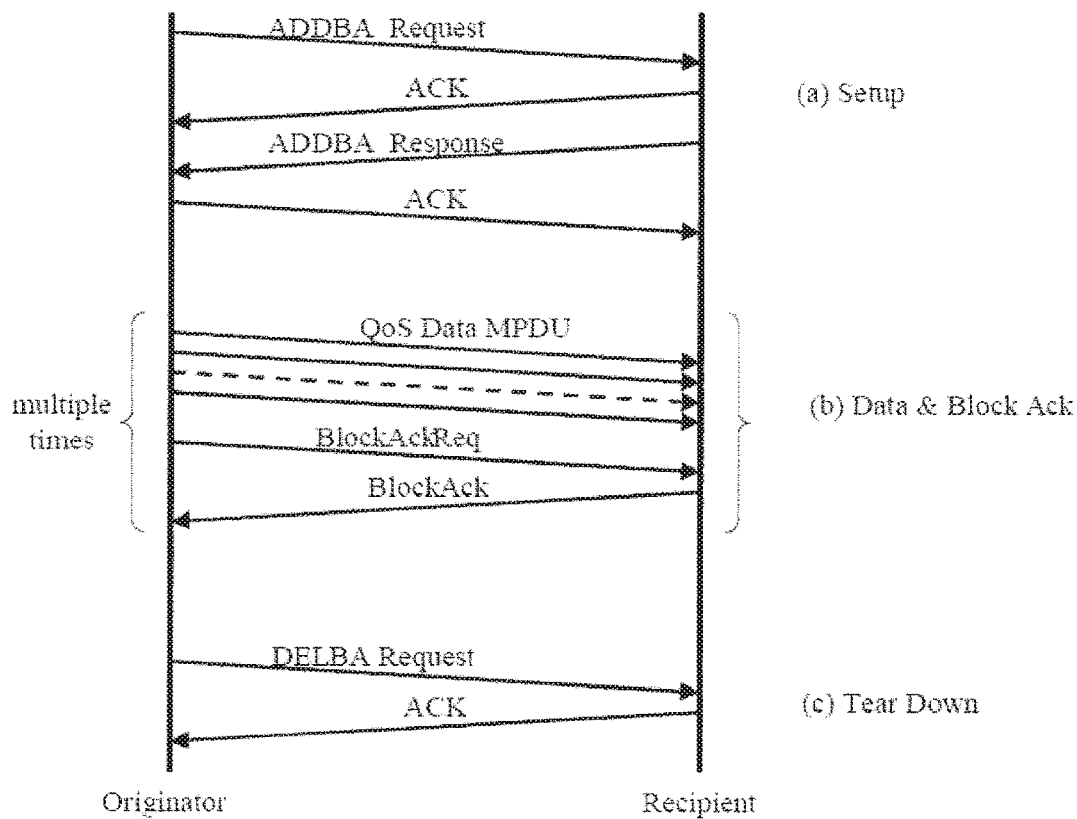
FIG. 3 is a diagram illustrating a block ACK mechanism used in a WLAN system.

FIG. 3 is a diagram illustrating a block ACK mechanism used in a WLAN system.

The block ACK mechanism may be initialized by an exchange of Add Block Acknowledgment (ADDBA) request/response frames as illustrated in FIG. 3 ((a) Setup step). After the block ACK mechanism is initialized, a block of Quality of Service (QoS) data frames may be transmitted by an originator to a recipient. Such a block may be started within a polled Transmission Opportunity (TXOP) or by winning Enhanced Distributed Channel Access (EDCA) contention. The number of frames in the block may be limited. MAC Packet Data Units (MPDUs) in the block of frames may be acknowledged by a BlockAck frame, which is requested by a BlockAckReq frame ((b) Data & Block ACK step).

When the originator has no data to transmit and a final block ACK exchange is completed, the originator may end the block ACK mechanism by transmitting a Delete Block Acknowledgment (DELBA) frame to the recipient. Upon receiving the DELBA frame, the recipient may release all resources allocated for Block ACK transfer ((c) Tear Down step).

Figure 4:
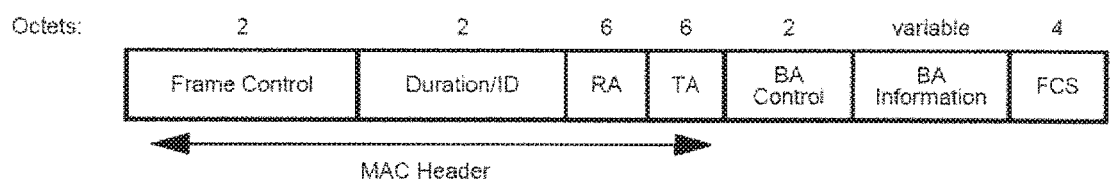
FIG. 4 is a diagram illustrating a basic configuration of a block ACK frame.

FIG. 4 is a diagram illustrating a basic configuration of a block ACK frame.

The block ACK frame may include a MAC Header field, a Block ACK (BA) Control field, and a BA Information field. The MAC Header field may include a Frame Control field, a Duration/ID field, an RA field, and a TA field. Herein, the RA field represents an address of a receiver STA and the TA field represents an address of a transmitter STA.

Figure 5:
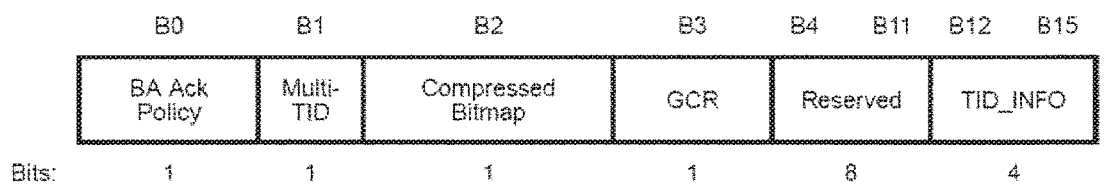
FIG. 5 is a diagram illustrating a detailed configuration of a BA Control field in FIG. 4.

FIG. 5 is a diagram illustrating a detailed configuration of the BA Control field in FIG. 4.

A value of a BA ACK Policy subfield in the BA Control field may have the meaning shown in Table 1 below.

TABLE 1

| Value | Meaning |
|---|---|
| 0 | Normal Acknowledgment.<br>The BA Ack Policy subfield is set to this value when the sender requires immediate acknowledgment.<br>The addressee returns an Ack frame.<br>The value 0 is not used for data sent under HT-delayed Block Ack during a PSMP sequence.<br>The value 0 is not used in frames transmitted by DMG STAs. |
| 1 | No Acknowledgment.<br>The addressee sends no immediate response upon receipt of the frame.<br>The BA Ack Policy is set to this value when the sender does not require immediate acknowledgment.<br>The value 1 is not used in a Basic BlockAck frame outside a PSMP sequence.<br>The value 1 is not used in an Multi-TID BlockAck frame. |

Meanwhile, Multi-Traffic Identifier (TID), Compressed Bitmap, and GCR subfields in the BA Control field may determine possible BlockAck frame variants according to the following regulation.

TABLE 2

| Multi-TID subfield value | Compressed Bitmap subfield value | GCR subfield value | BlockAck frame variant |
|---|---|---|---|
| 0 | 0 | 0 | Basic BlockAck |
| 0 | 1 | 0 | Compressed BlockAck |
| 1 | 0 | 0 | Extended Compressed BlockAck |
| 1 | 1 | 0 | Multi-TID BlockAck |

TABLE 2-continued

| Multi-TID subfield value | Compressed Bitmap subfield value | GCR subfield value | BlockAck frame variant |
|---|---|---|---|
| 0 | 0 | 1 | Reserved |
| 0 | 1 | 1 | GCR BlockAck |
| 1 | 0 | 1 | Reserved |
| 1 | 1 | 1 | Reserved |

Figure 6:
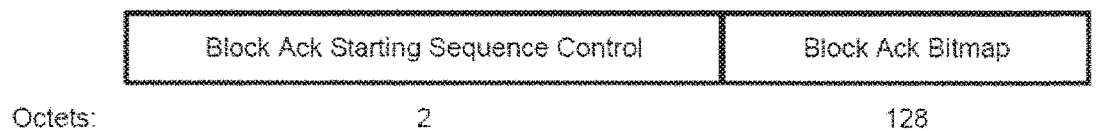
FIG. 6 is a diagram illustrating a detailed configuration of a BA Information field in FIG. 4.
Figure 7:
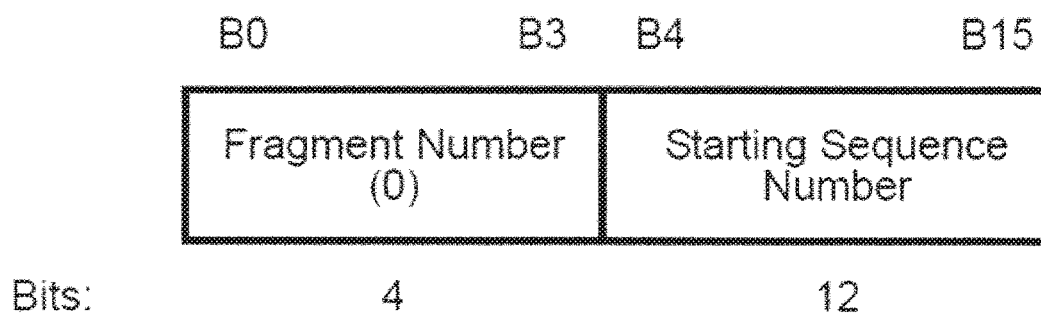
FIG. 7 is a diagram illustrating a configuration of a Block ACK Start Sequence Control subfield.

FIG. 6 is a diagram illustrating a detailed configuration of the BA Information field in FIG. 4 and FIG. 7 is a diagram illustrating a configuration of a Block ACK Start Sequence Control subfield.

As illustrated in FIG. 6, the BA Information field may include a Block ACK Starting Sequence Control (SSC) subfield and a Block ACK Bitmap subfield.

As illustrated in FIG. 6, the Block ACK Bitmap subfield is 128 octets in length and thus may represent a reception status of 64 MAC Service Data Units (MSDUs). If a bit position n of the Block ACK Bitmap subfield is set to 1, this may indicate that an MPDU having an MPDU sequence control value corresponding to (SSC+n) has been successfully received, wherein SSC denotes a value of the Block ACK Starting Sequence Control subfield. In contrast, if the bit position n of the Block ACK Bitmap field is set to 0, this may indicate that the MPDU having the MPDU sequence control value corresponding to (SSC+n) has not been received. Each of values of an MPDU Sequence Control field and the Block ACK Starting Sequence Control subfield may be treated as a 16-bit unsigned integer. For unused fragment numbers of an MSDU, corresponding bits in a bitmap may be set to 0.

Figure 8:
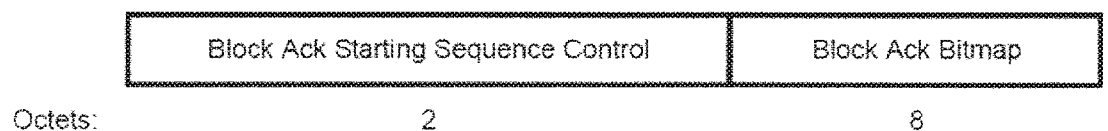
FIG. 8 is a diagram illustrating a configuration of a BS Information field of a compressed BlockAck frame.

FIG. 8 is a diagram illustrating a configuration of a BS Information field of a compressed BlockAck frame.

As illustrated in FIG. 8, a Block ACK Bitmap subfield of the BS Information field of the compressed BlockAck frame may be 8 octets in length and indicate a reception status of 64 MSDUs and A-MSDUs. The first bit of a bitmap corresponds to an MSDU or an A-MSDU matching a value of a Block ACK Starting Sequence Control subfield and respective bits may sequentially correspond to MSDUs or A-MSDUs after the above MSDU or the A-MSDU.

Figure 9:
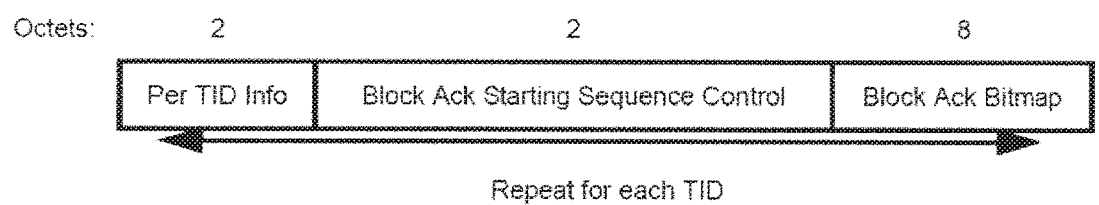
FIG. 9 is a diagram illustrating a BA Information field of a multi-TID Block ACK frame.

FIG. 9 is a diagram illustrating a BA Information field of a multi-TID BlockAck frame.

A TID_INFO subfield of the BA Information field of the multi-TID BlockAck frame contains information about the number of TIDs in the BA Information field. Specifically, a value of the TID_INFO subfield represents (the number of TIDs corresponding to information of the BA Information field)−1. For example, if the value of the TID_INFO subfield is 2, this may indicate that the BA Information field contains information about three TIDs.

Meanwhile, the multi-TID BlockAck frame may include a Per TID Info subfield in addition to a Block ACK Starting Sequence Control subfield and a Block ACK Bitmap subfield as illustrated in FIG. 9. The first emerging Per TID Info, Block ACK Starting Sequence Control, and Block ACK Bitmap subfields may be transmitted in correspondence to the lowest TID value and subsequently repeated subfields may correspond to the next TID. A triplet of these subfields may be repeated per TID.

Figure 10:
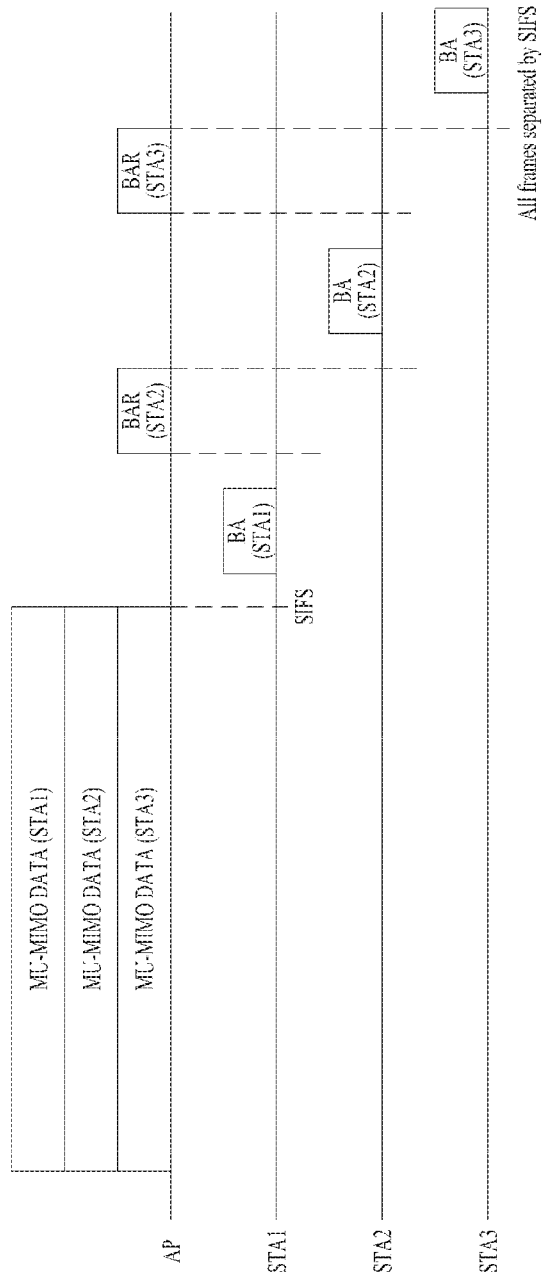
FIGS. 10 and 11 are diagrams for explaining the case in which a block ACK mechanism is applied to a DL MU-MIMO scheme.
Figure 11:
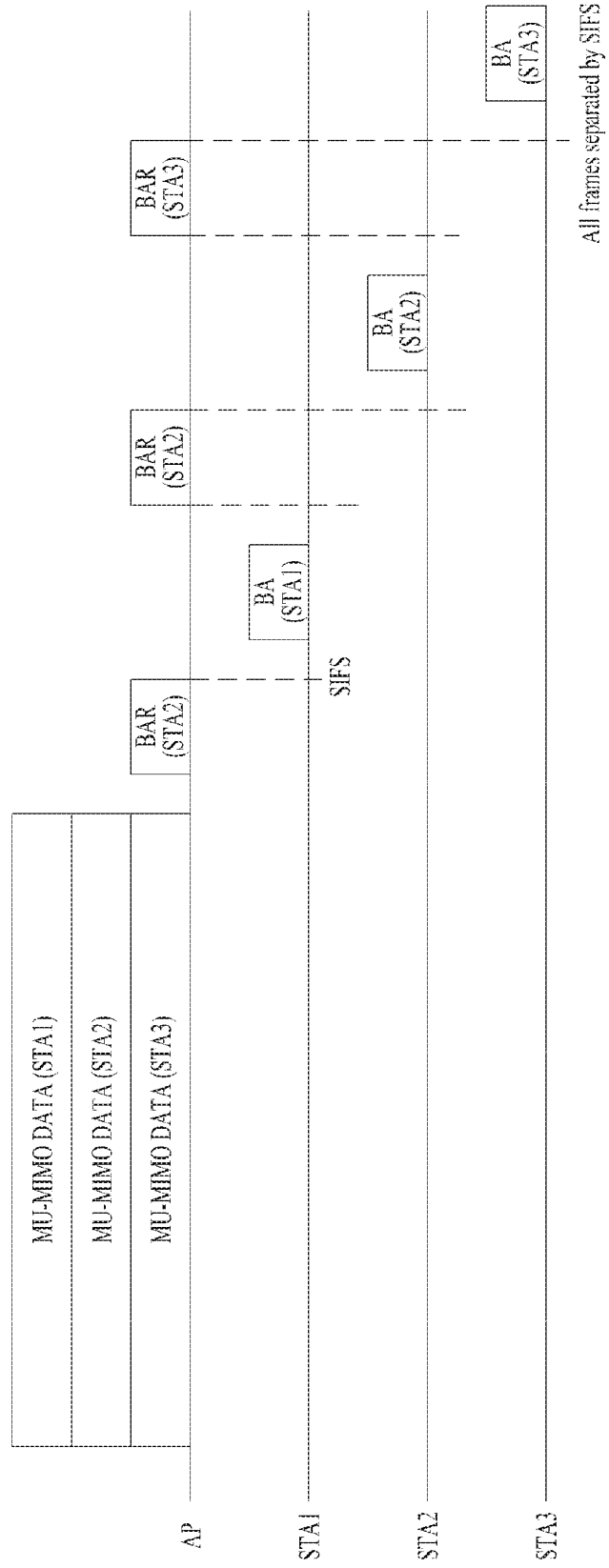

FIGS. 10 and 11 are diagrams for explaining the case in which a block ACK mechanism is applied to a DL MU-MIMO scheme.

As illustrated in FIGS. 10 and 11, an AP may transmit MU-MIMO data frames to a plurality of STAs STA 1 to STA 3.

It is assumed in FIG. 10 that frame exchange is performed after a Short InterFrame Space (SIFS) after an MU PLCP Packet Data Unit (PPDU) is transmitted. It is also assumed in FIG. 10 that for STA1, an implicit block ACK request is configured as ACK policy and, for STA 2 and STA 3, a block ACK is configured as ACK policy. Then, STA 1 may immediately transmit a BA frame after receiving a DL MU PPDU even without receiving a request for the block ACK. In contrast, the AP may perform polling by transmitting a BA request (BAR) frame to STA 2 and STA 3 and then STA 2 and STA 3 may transmit BA frames.

Meanwhile, FIG. 11 illustrates an example of performing a frame exchange without an SIFS after an MU PPDU is transmitted and it is assumed that a block ACK is configured as ACK policy for all STAs. Therefore, the AP may perform polling by transmitting a BAR frame to all STAs.

Figure 12:
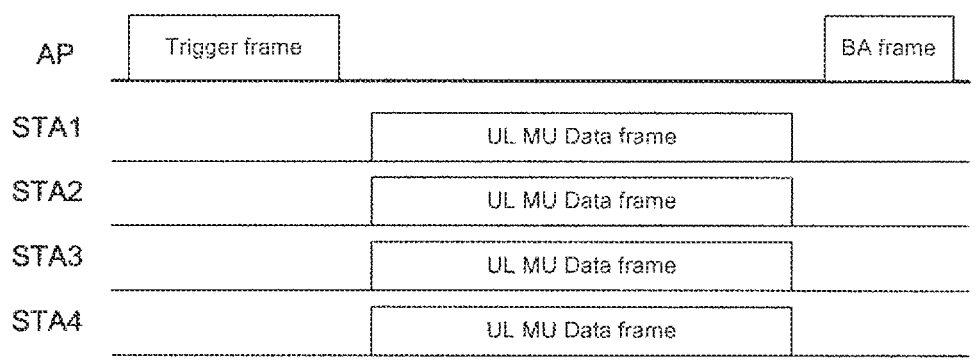
FIG. 12 is a diagram for explaining a UL MU transmission situation to which the present invention is applicable.

FIG. 12 is a diagram for explaining a UL MU transmission situation to which the present invention is applicable.

A UL MU transmission scheme may be used in an 802.11ax system as described above and may be initialized when an AP transmits a trigger frame to a plurality of STAs (e.g., STA 1 to STA 4) as illustrated in FIG. 12. The trigger frame may include UL MU allocation information (e.g. resource location and size, STA IDs, an MCS, and an MU type (MIMO, OFDMA, etc.)). Specific examples of information transmitted in the trigger frame may be as follows.

TABLE 3

Duration of UL MU frame
Number of allocation (N)
Each allocation's Information
  SU/MU
  AID (As many AIDs as the number of STAs is additionally
  included in the case of MU.)
  Power adjustment
  Tone(/Resource) allocation information (e.g., bitmap)
  MCS
  Nsts
  STBC
  Coding
  Beamformed
  Etc.

Meanwhile, as illustrated in FIG. 12, the AP may obtain a TXOP for transmitting the trigger frame via a contention procedure in order to access a medium. The STAs may transmit UL data frames with a format indicated by the AP after an SIFS of the trigger frame. It is assumed that the AP according to the present invention transmits an ACK of the UL MU data frames through a BA frame.

However, the above-described BA frame for the UL MU frames considerably increases in size as compared with a BA frame for a UL MU frame, thereby causing a serious overhead problem. For example, the BA frame transmitted by STA 1 in FIGS. 10 and 11 includes BA information about data transmitted by the AP to STA 1, whereas the BA frame transmitted by the AP in FIG. 12 includes BA information about the UL MU data frames transmitted by STA 1 to STA 4. In addition, since the size of a MAC frame corresponds to 32 bytes when a compressed Block ACK is used and 150 bytes when a normal block ACK is used, overhead may be problematic.

First Aspect of the Present Invention—Using Multi-TID Block ACK Frame

Accordingly, exemplary embodiments of the present invention propose a method for efficiently transmitting a BA frame by using a multi-TID block ACK frame format among the above-described BA frames.

Figure 13:
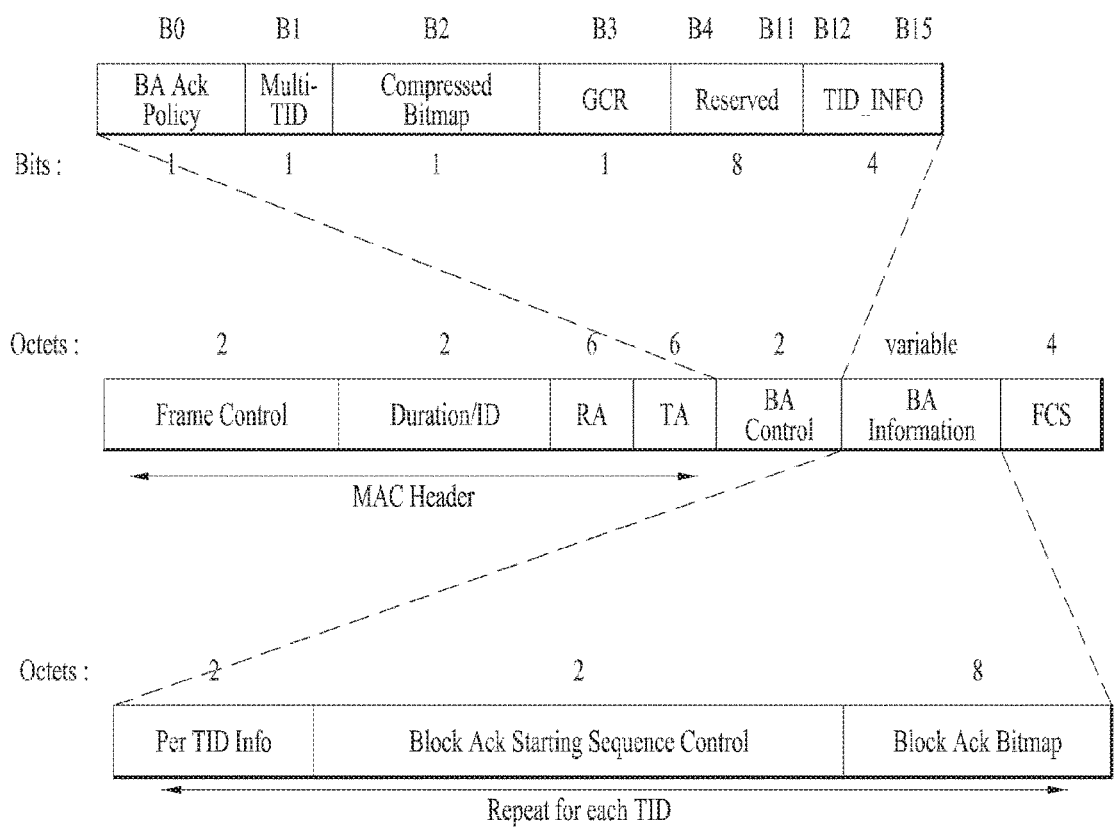
FIG. 13 is a diagram illustrating a frame structure to be used for a DL MU block ACK mechanism according to an exemplary embodiment of the present invention.

FIG. 13 is a diagram illustrating a frame structure to be used for a DL MU block ACK mechanism according to an exemplary embodiment of the present invention.

A multi-STA BA frame to be used according to an embodiment of the present invention may basically have a multi-TID BA frame as illustrated in FIG. 13 and may desirably include an indicator indicating that a corresponding BA frame is not a simple multi-TID BA frame but a multi-STA BA frame. Accordingly, a BA Information field may include BA information about different STAs as opposed to a conventional field.

Figure 14:
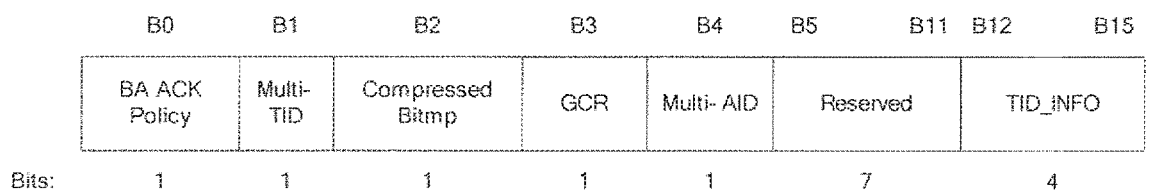
FIG. 14 is a diagram illustrating an exemplary changed configuration of a BA Control field in FIG. 13.

FIG. 14 is a diagram illustrating an exemplary changed configuration of a BA Control field in FIG. 13.

A BA Control field illustrated in FIG. 14 further includes a Multi-AID field as compared with the BA Control field in FIG. 13. The Multi-AID field may serve as an indicator indicating that the Multi-TID BA frame is a BA frame for a plurality of STAs as described above and include other additional information for a plurality of AIDs.

In this way, if the BA frame for multiple STAs is configured, it is desirable to include (partial) AID information for each STA. A Per TID Info field or a field corresponding to the Per TID Info field may be used for the AID information.

Figure 15:
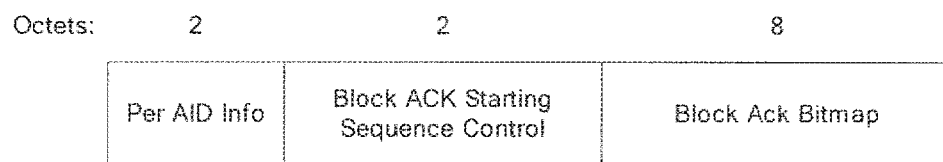
FIG. 15 is a diagram illustrating an example of using a BA Information field of FIG. 13 when a BA frame is used as a multi-STA BA frame.

FIG. 15 is a diagram illustrating an example of using a BA Information field of FIG. 13 when a BA frame is used as a multi-STA BA frame.

A Block ACK Starting Sequence Control subfield and a Block ACK Bitmap subfield illustrated in FIG. 15 may perform similar functions to those described above. Notably, in FIG. 15, a Per TID Info field is used as a Per AID Info field and includes the Block ACK Starting Sequence Control subfield and the Block ACK Bitmap subfield per AID.

This configuration may be used when a Multi-AID field illustrated in FIG. 14 is set to a specific value (e.g., 1) to indicate that the BA frame is a Multi-STA BA frame.

Figure 16:
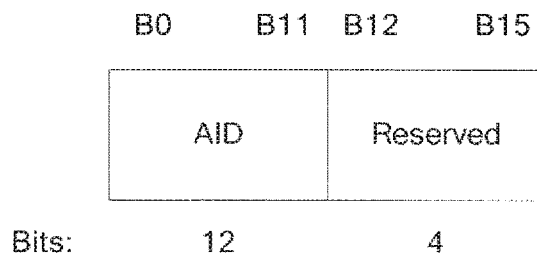
FIG. 16 is a diagram illustrating a configuration of a Per AID Info field in FIG. 15.

FIG. 16 is a diagram illustrating a configuration of a Per AID Info field in FIG. 15.

The Per AID Info field may use a predetermined length to indicate AIDs of a plurality of STAS as illustrated in FIG. 16. Although the size of AID information is expressed as 12 bits in FIG. 16, it will be apparent to those skilled in the art that the size of the AID field may be defined as bits smaller than 12 bits when an abbreviated AID such as a PAID is used.

Meanwhile, an exemplary embodiment of the present invention proposes that BA indicator information indicating whether the Block ACK Starting Sequence Control subfield and/or the Block ACK Bitmap subfield may be omitted be additionally included in the Per TID Info field (or the Per AID Info field as illustrated in FIGS. 15 and 16) of the Multi-TID frame in order to efficiently solve an overhead problem that may occur in using the Multi-STA BA frame as described above.

For example, if an AP has successfully received all MPDUs/Aggregated MPDUs (A-MPDUs) transmitted through a UL MU PPDU from a specific STA, the Block ACK Starting Sequence Control field and the Block ACK Bitmap field may not be needed. As another example, if the AP has successfully received all MPDUs/A-MPDUs starting from a specific MPDU/A-MPDU among a plurality of MPDUs/A-MPDUs transmitted through a UL MU PPDU from a specific STA, Block ACK starting sequence information is needed but Block ACK bitmap information may not be needed. Accordingly, in these situations, if 'BA indicator information' is additionally contained after AID information of the Per TID Info field (or the Per AID Info field) and then transmitted, overhead caused by the Block ACK Starting Sequence Control subfield and/or the Block ACK Bitmap subfield in the case in which the Block ACK Starting Sequence Control subfield and/or the Block ACK Bitmap subfield are not needed can be reduced.

Figure 17:
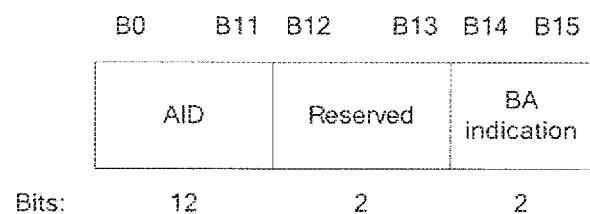
FIG. 17 illustrates the case in which BA indicator information is added after an AID field and a Reserved field.

FIG. 17 illustrates the case in which BA indicator information is added after an AID field and a Reserved field. However, it is apparent that the BA indicator information is located immediately after the AID information.

A specific embodiment of the present invention proposes that the BA indicator information be configured by 2 bits representing the following information.

(1) 00: Normal BA information. This indicates that both the Block ACK Starting Sequence Control field and the Block ACK Bitmap field are included as illustrated in FIG. 15.

Figure 18:
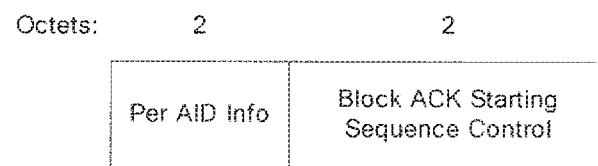
FIGS. 18 and 19 are diagrams illustrating the case in which a Block ACK Starting Sequence Control field and/or a Block ACK bitmap field are omitted according to an embodiment of the present invention.

(2) 01: Partial BA information. This indicates that all remaining MSDUs/A-MSDUs (or MPDUs/A-MPDUs) starting from an MSDU/A-MSDU (or MPDU/A-MPDU) indicated by the Block ACK Starting Sequence Control field have been successfully received. In this case, only the Block ACK Starting Sequence Control field may be included in the BA Information field together with Per AID Info (Per TID Info) and then transmitted as illustrated in FIG. 18.

Figure 19:
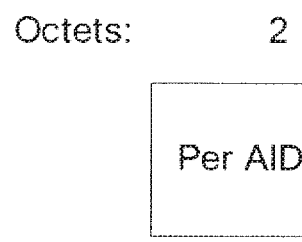

(3) 10: This indicates that a corresponding MPDU has been successfully received and represents ACK when a received PPDU is a single MPDU. This also indicates that all MPDUs included in a PPDU have been successfully received when the received PPDU includes a plurality of MPDUs. In this case, only the Per AID Info field (as another name, Per TID Info field) may be included in the BA Information field without including the Block ACK Starting Sequence Control field and the Block ACK bitmap as illustrated in FIG. 19.

(4) 11: Reserved

In the above description, the BA indication value is purely exemplary and other values may be set as the BA indication value.

Figure 20:
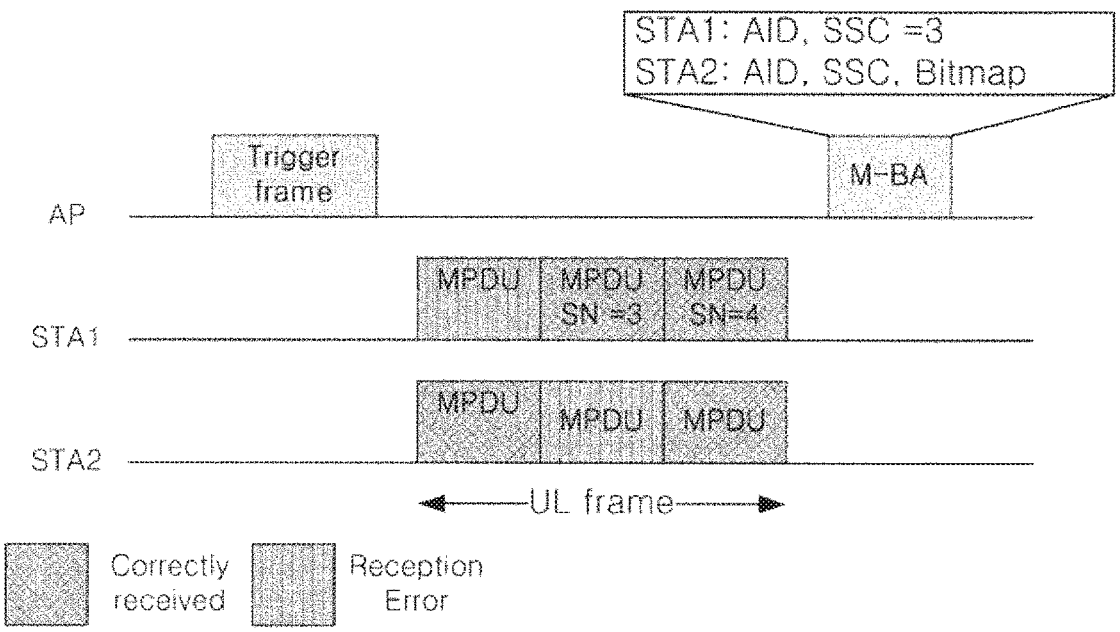
FIGS. 20 to 22 are diagrams for explaining a multi-STA block ACK mechanism using a BA indicator.
Figure 21:
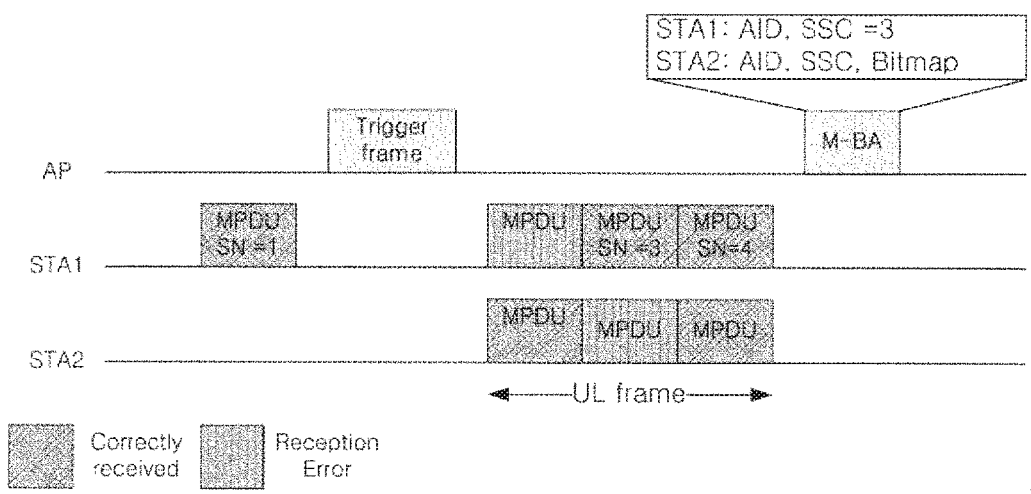
Figure 22:
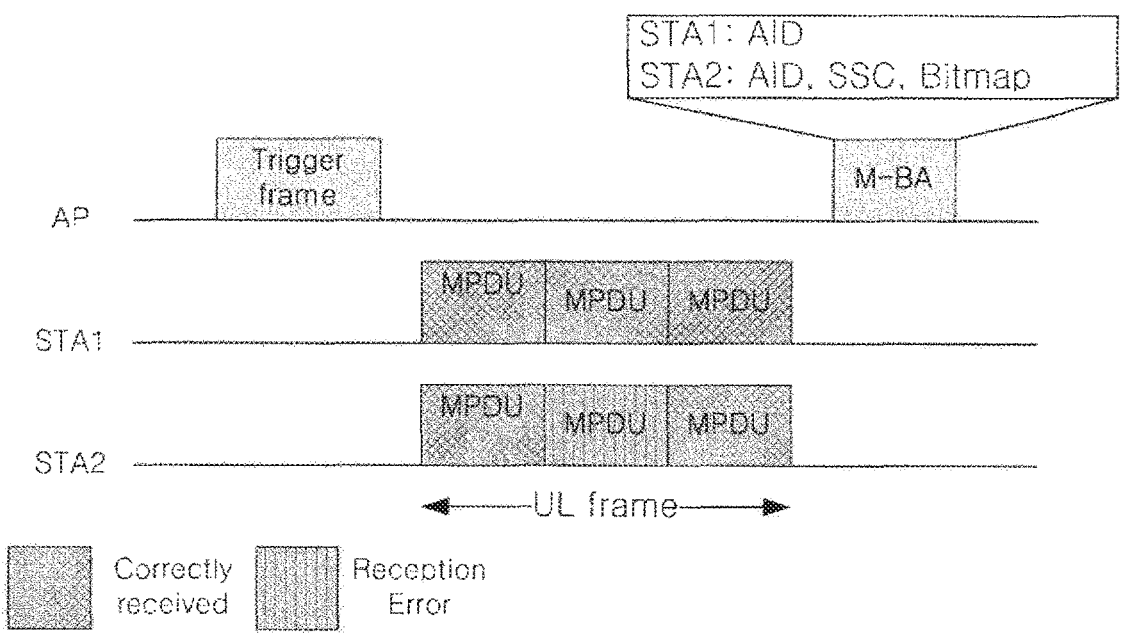

FIGS. 20 to 22 are diagrams for explaining a multi-STA block ACK mechanism using the above-described BA indicator.

In FIG. 20, an AP may transmit a trigger frame for UL MU transmission to a plurality of STAs (e.g., STA 1 and STA 2). STA 1 and STA 2 may transmit PPDUs each including a plurality of MPDUs in response to the trigger frame.

If the AP has successfully received all MPDUs after an MPDU corresponding to sequence number 3 among a plurality of MPDUs received from STA 1, the AP may omit a block ACK bitmap for STA 1 and configure and transmit a BA Information field including a Block ACK Starting Sequence Control subfield corresponding to SSC=3 and AID information. In this case, according to the above-described BA indicator regulation, the BA indicator may indicate a value 01.

Meanwhile, if there is an MPDU that has been successfully received before an MPDU that the AP has failed to receive among a plurality of MPDUs received from STA 2 as illustrated in FIG. 20, the block ACK bitmap cannot be omitted as opposed to STA 1 and may transmit the AID information, the Block ACK Starting Sequence Control subfield, and the block ACK bitmap to STA 2. In this case, according to the above-described BA indicator regulation, the BA indicator may indicate a value 00.

Meanwhile, FIG. 21 illustrates the case in which there is a successfully received MPDU from STA1 before the trigger frame is received as opposed to FIG. 20.

Even when all MPDUs transmitted after a specific MPDU, including a previous PPDU as well as a current PPDU, have been successfully received, only an SSC (Starting Sequence Control subfield) may be transmitted. This indicates that all MPDUs starting from an MPDU indicated by a sequence number of the SSC have been successfully received. That is, FIG. 21 shows that MPDUs starting from an MPDU corresponding to SSC=3 of STA 1 have been successfully received.

FIG. 22 illustrates the case in which all MPDUs received from STA 1 have been successfully received. In this case, according to the above-described BA indicator regulation, the BA indicator value is set to 10 and a BA Information field may be transmitted by omitting both the SCC and the bitmap.

Figure 23:
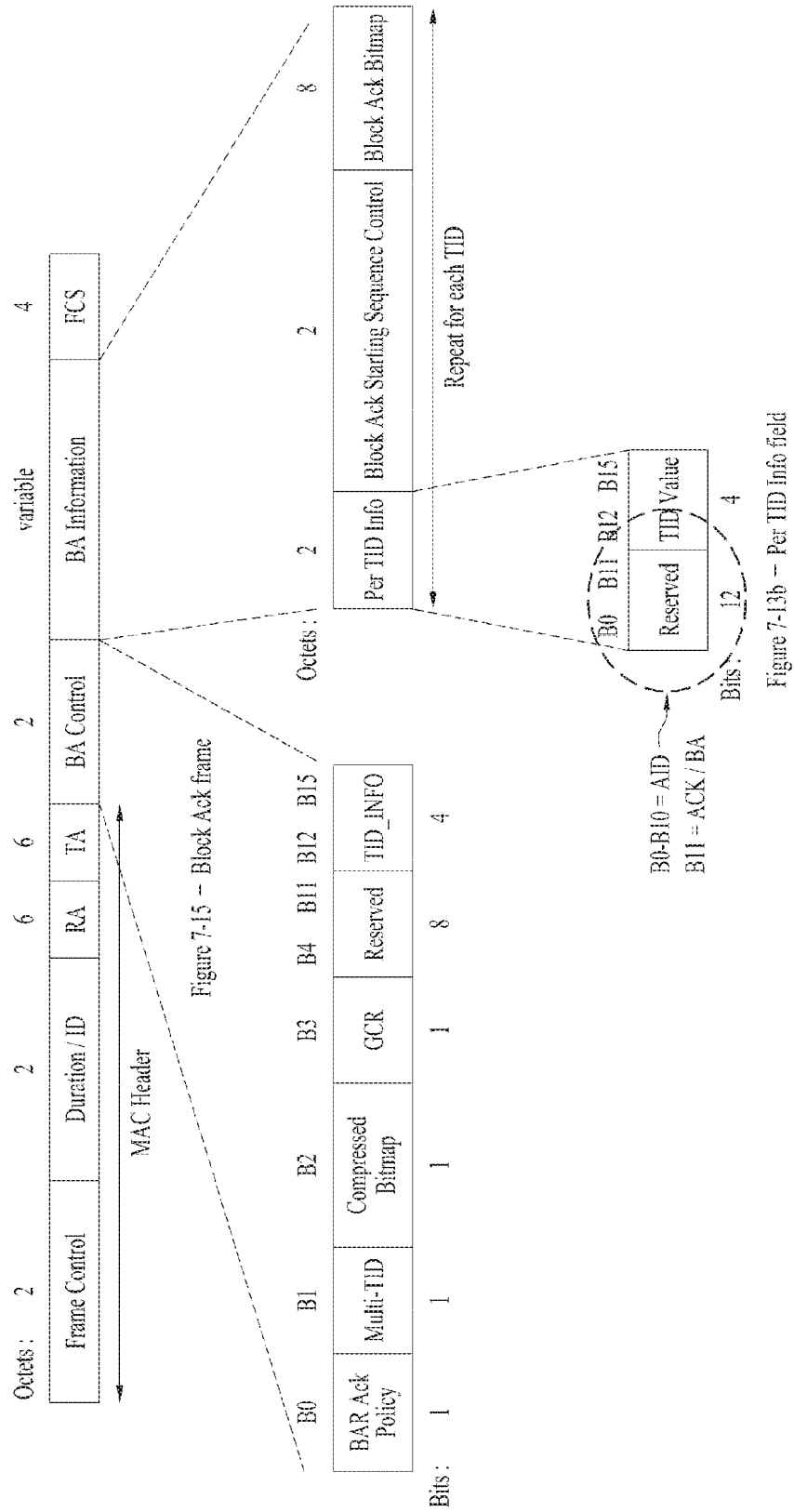
FIG. 23 is a diagram illustrating a multi-STA BA frame format according to another embodiment of the present invention.

FIG. 23 is a diagram illustrating a multi-STA BA frame format according to another embodiment of the present invention.

In FIG. 23, AID information and the above-described BA indicator information are transmitted using 12 reserved bits of a Per TID Info field of a BA Information field. It is noted in FIG. 23 that the BA indicator information indicates ACK/BA using one bit. Specifically, the first bit B0 to the eleventh bit B10 of the Per TID Info field indicate AID information and the twelfth bit B11 indicates that ACK/BA information representing whether a Block ACK Starting Sequence Control subfield and a Block ACK Bitmap subfield are omitted in a BA Information field for a corresponding TID (AID) is included.

If B11 of the Per TID Info field is set, this may indicate that the Block ACK Bitmap and Block ACK Starting Sequence Control subfields are omitted in the BA Information field. In this case, the BA Information field may indicate that all MPDUs (in the case of a single MPDU, a corresponding single MPDU) received through a PPDU from an STA of a corresponding AID have been successfully received.

That is, in the embodiment of FIG. 23, only All ACK indication among BA indicator values is expressed by 1-bit information. However, an indicator for the case in which only an SCC is included may be regulated in an additional field and various other combinations may be applied according to the structure of a corresponding frame.

The Block ACK Starting Sequence Control field may indicate that all MPDUs starting from an MPDU indicated by a specific sequence number have been received or a specific bit or a specific value in a TID Value field may indicate that there is no block ACK bitmap. In this case, an ACK/BA indication bit of the Per TID Info field may indicate BA.

Meanwhile, a specific bit/field of the Block ACK Starting Sequence Control field or a specific value of a specific field may indicate whether a block ACK bitmap is present. For example, in the Block ACK Starting Sequence Control field, a specific value of a Fragment Number field or specific bits (M LSB bits (where M=2 or 3)) of the Fragment Number field may indicate block ACK bitmap length and a specific value (e.g., all 1 or all 0) may indicate that there is no block ACK bitmap.

Second Aspect of the Present Invention—Using ACK Frame Other than Block ACK Frame In the above-described first aspect, the method of reducing overhead by using a multi-TID block ACK frame while omitting a start sequence and/or a bitmap when data of all STAs has been successfully received is described. When all UL MU frames have been successfully received as described above, however, use of a block ACK frame may not be profitable for an AP. In a second aspect of the present invention, a method of transmitting an ACK signal for a plurality of STAs by using an ACK frame other than the block ACK frame will be described.

Figure 24:
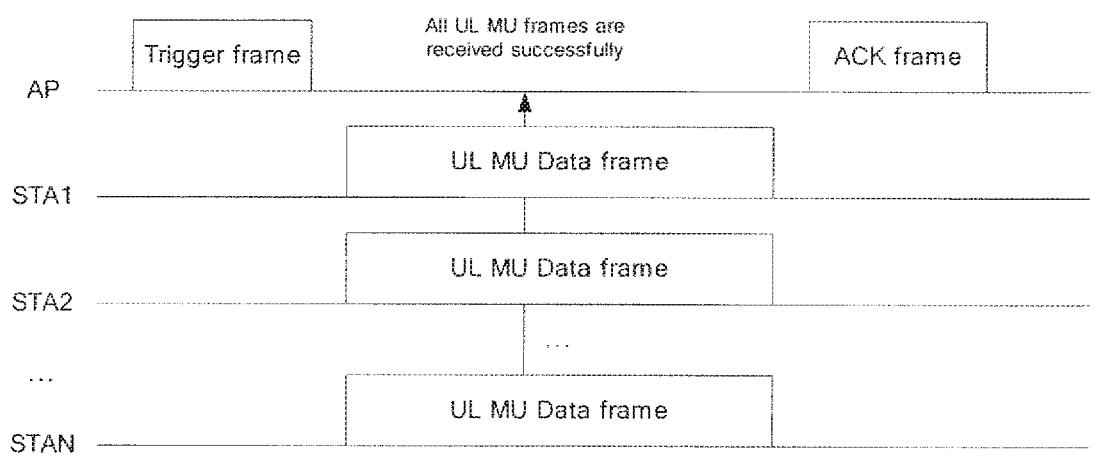
FIG. 24 is a diagram for explaining an example in which an AP simultaneously transmits ACK signals to a plurality of STAs according to an embodiment of the present invention.

FIG. 24 is a diagram for explaining an example in which an AP simultaneously transmits ACK signals to a plurality of STAs according to an embodiment of the present invention.

As described above, an AP may transmit a trigger frame for UL MU transmission, as described above. FIG. 24 illustrates an example when all UL MU frames have been successfully received. In this case, the AP can reduce overhead by transmitting an ACK frame instead of the aforementioned block ACK frame. As illustrated in FIG. 24, a UL MU frame desirably refers to a frame received through a resource indicated by a most recently transmitted trigger frame.

However, it is necessary to indicate that the ACK frame is not simple ACK but ACK for all data (or data of a group including a plurality of STAs). This will be described hereinbelow.

Figure 25:
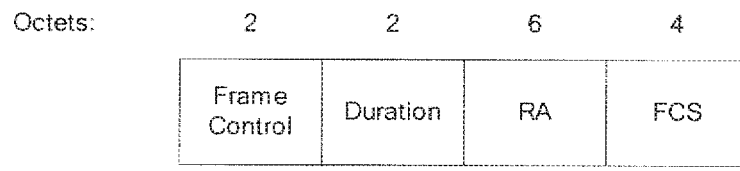
FIG. 25 is a diagram illustrating an ACK frame format according to an embodiment of the present invention.

FIG. 25 is a diagram illustrating an ACK frame format according to an embodiment of the present invention.

As illustrated in FIG. 25, an ACK frame may include a frame control field, a duration field, an RA field, etc. The RA of the ACK frame will include a broadcast address or a multicast address (when a multicast address/group is allocated).

As described above, it is desirable that the ACK frame according to the present embodiment include Group ACK (All ACK) indication information. In the following description, the terms "Group ACK Indication" and "All ACK Indication" are used interchangeably. "All ACK Indication" may be discriminated from "Group ACK Indication" in that the former is ACK for all received uplink data and the latter is ACK for all uplink data of STAs in a specific group (e.g., STAs in an STA group for which ACK policy is set to 00 as will be described below) among all STAs. However, these two terms may be used interchangeably unless explicitly discriminated from each other.

Group ACK indication=0 can indicate that corresponding ACK is normal ACK and Group ACK indication=1 can indicate that a corresponding ACK is Group ACK (All ACK). When STAs that have transmitted UL MU data frames receive an ACK frame indicating Group ACK, the STAs can determine that the UL MU frames transmitted thereby have been successfully transmitted.

The group ACK indication information may be delivered to an STA using an existing field. For example, To DS, From DS, More Flag, Retry, Protected Frame, etc. among subfields of the Frame Control field of FIG. 25 can indicate the group ACK indication information/All ACK Indication information by being set to 0 in a control frame. To indicate Group ACK, one (e.g., More Flag or Retry) of such fields may be set to 1.

It is apparent that the concept of All ACK Indication information/Group ACK Indication information in the second aspect of the present invention is applicable to the MU block ACK frame described in the first aspect of the present invention.

Meanwhile, an embodiment of the present invention proposes a method of operating All/Group ACK Indication information in a limited manner such that the All/Group ACK Indication information indicates successful reception of all data of STAs which transmit ACK policy as a specific value among a plurality of STAs, as described above.

Figure 26:
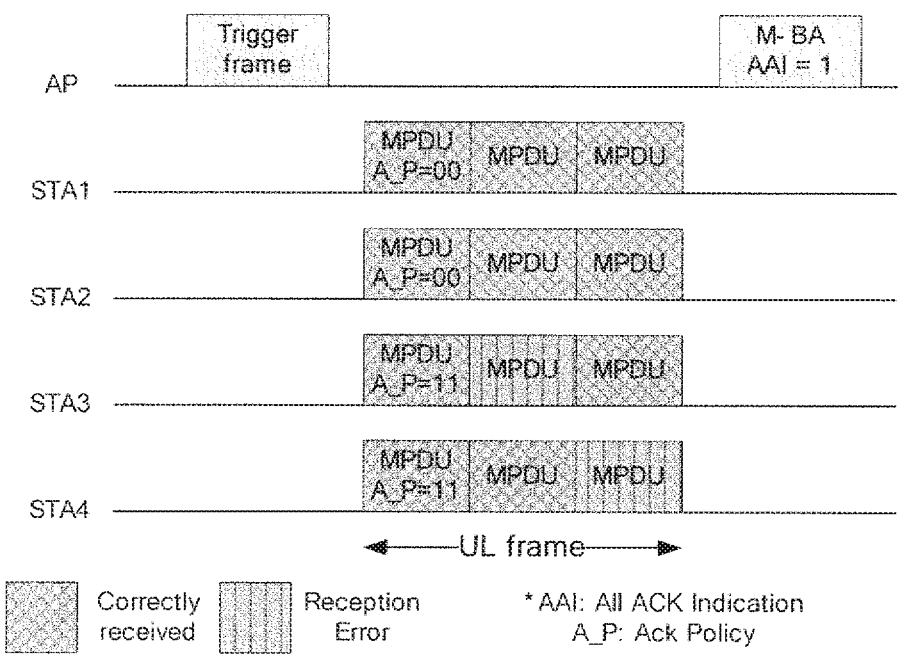
FIG. 26 is a diagram for explaining a method of transmitting an ACK frame according to ACK policy setting of an STA.

FIG. 26 is a diagram for explaining a method of transmitting an ACK frame according to ACK policy setting of an STA.

In the present embodiment, the range of STAs is limited to STAs that have transmitted UL MU PPDUs for which ACK policy has been set to 00 (ACK for a single MPDU or implicit BA for multiple MPDUs) among all STAs. That is, when an AP has successfully received all MPDUs included in all UL MU PPDUs transmitted from all STAs allocated by a trigger frame (all MPDUs have been received), All ACK (or Group ACK) indication may be set to 1 and transmitted in order to indicate such successful reception to STAs that have transmitted PPDUs for which ACK policy has been set to 00 (ACK or implicit BA).

Specifically, FIG. 26 illustrates an example in which STA 1 and STA 2 set ACK policy to 00 and transmit MPDUs, and STA 3 and STA 4 set ACK policy to 11 and transmit MPDUs. In this example, an AP has successfully received the MPDUs for which ACK policy has been set to 00 from STA 1 and STA 2 and thus transmits ACK for the MPDUs using All ACK indication (AAI).

It is assumed that STA 3 and STA 4 set ACK policy to 11 and ACK therefor is transmitted after reception of an ACK request frame from STA 3/4. Accordingly, an MPDU that is not received from STA 3/4 may be present when a response is sent to STA 1/2 through AAI.

When STAs (e.g., STA 1/2) that have transmitted UL MU frames for which ACK policy has been set to 00 receive an ACK/BA frame in which All ACK indication is set to 1, the STAs can determine that all MPDUs (single MPDU or multiple MPDUs) transmitted thereby have been successfully transmitted. That is, All ACK indication==1 can indicate that all MPDUs included in PPDUs for which ACK policy has been set to 00 have been successfully received.

That is, All ACK Indication=1 may be limited to a case in which an AP has successfully received all MPDUs included in PPDUs for which ACK policy has been set to 00 (ACK for a single MPDU or implicit BA for multiple MPDUs) instead of successfully receiving all MPDUs included in UL MU PPDUs transmitted by all STAs allocated by a trigger frame. In this case, All ACK indication is set to 1 and BA Information is not included.

It is desirable to receive at least one MPDU for a PPDU for which ACK policy has been set to a value other than 00 (e.g., 11 (Block ACK)). ACK policy of the corresponding STA can be checked through the MPDU.

Figures 27, 28:
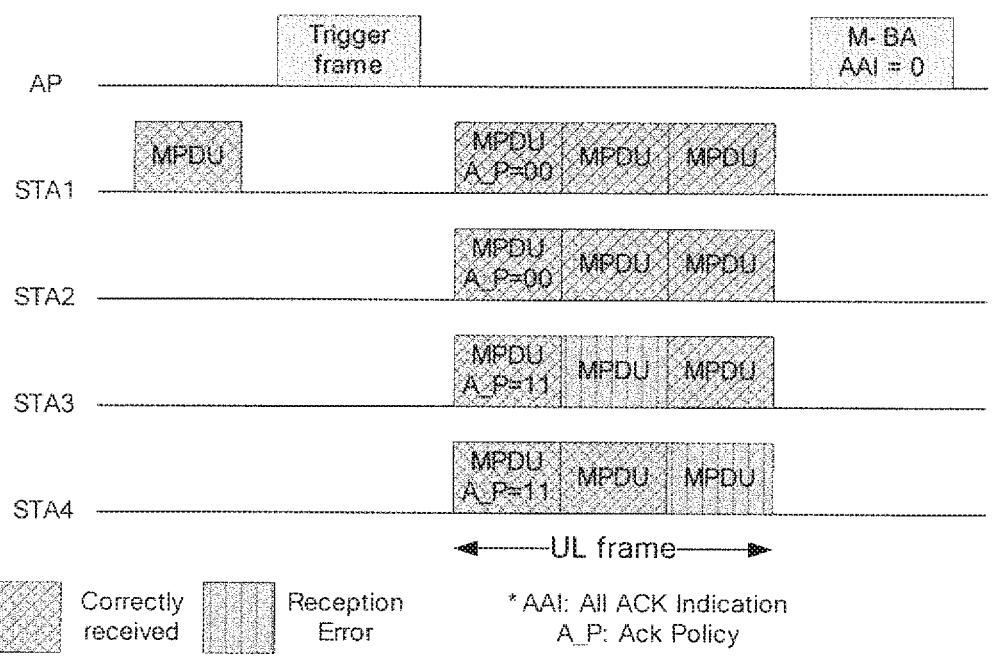
FIG. 27 is a diagram for explaining a target of All ACK Indication in an embodiment of the present invention.
FIG. 28 is a diagram illustrating a BA frame format and FIG. 29 is a diagram illustrating a BA control field format in a BA frame.

FIG. 27 is a diagram for explaining a target of All ACK indication in an embodiment of the present invention.

In the aforementioned embodiment, a UL MU PPDU refers to a PPDU transmitted through a resource allocated by a most recently transmitted trigger frame. That is, it is desirable to exclude previously transmitted PPDUs.

Accordingly, even when all MPDUs included in PPDUs for which ACK policy has been set to 00 (ACK for a single MPDU or implicit BA for multiple MPDUs) have been successfully received, ALL ACK indication may not be set to 1 when a response to MPDUs that have been transmitted before the PPDU needs to be sent, as shown in FIG. 27.

FIG. 27 illustrates an example in which, although an AP has successfully received all MPDUs included in a UL MU PPDU for which ACK policy has been set to 00 from STA 1, AAI is set to 0 because there is an MPDU previously received and a response to the MPDU needs to be performed.

The aforementioned concept is applicable to a multi-TID block ACK frame or a multi-STA block ACK frame.

Figures 29, 30, 31:
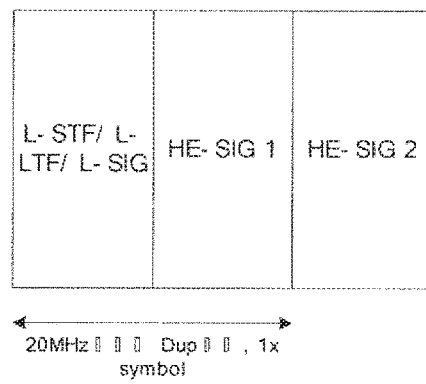
FIG. 30 is a diagram for explaining a case in which ACK for MU UL data is transmitted using an NDP frame according to an embodiment of the present invention.
FIGS. 31 to 34 are diagrams for explaining BA information configurations when ACK/NACK type is represented by 10.

FIG. 28 is a diagram illustrating a frame format when All ACK (Group ACK) indication is set to 1 in a BA frame, a multi-TID block ACK frame or a multi-STA block ACK frame and FIG. 29 is a diagram illustrating a BA control field format in one of a BA frame, a multi-TID block ACK frame and a multi-STA block ACK frame.

Group ACK (All ACK) indication may be included and transmitted in a BA control field, as illustrated in FIG. 29. When Group ACK indication is set to 1, a block ACK frame, a multi-TID block ACK frame or a multi-STA block ACK frame that does not include a BA information field may be configured as illustrated in FIGS. 28 and 29.

The aforementioned procedure for setting All ACK indication of an ACK frame, a BA (Block ACK) frame, a multi-TID block ACK frame or a M-BA (multi-STA block ACK) frame is equally applicable not only to the aforementioned method for setting or transmitting All ACK indication of an ACK frame but also to setting All ACK indication in an NDP MU BA/ACK frame which will be described below.

FIG. 30 is a diagram for explaining a case in which ACK for MU UL data is transmitted using an NDP frame according to an embodiment of the present invention.

As illustrated in FIG. 30, an NDP frame may include an L/STF/L-LTF/L-SIG part, an HE-SIG 1 part and an HE-SIG 2 part. FIG. 20 shows a case in which the L-part to HE-SIG 1 part are repeatedly transmitted in units of 20 MHz.

HE-SIG1 shown in FIG. 30 includes common information such as a BW, a BSS color (index), a GI length, an HE-SIG2 length and an HE-SIG2 MCS, and HE-SIG2 includes content of group block ACK. HE-SIG2 may be duplicated and transmitted in units of 20 MHz similar to HE-SIG1 and may be transmitted in the bandwidth indicated by HE-SIG1.

Contents of NDP MU group block ACK may be as follows.

TABLE 4

NDP frame indication
NDP type:
    00: indicates MU Group Block ACK.
MU Group ACK indication (1bit):
    1: indicates that all UL MU frames have been successfully received.
    In this case, the remaining bit is reserved. This information can be
    indicated by NDP type.
Multi-AID indication: includes ACK/BA information about multiple AID.
Number of STA AIDs
For (per STA) { //Multi-AID indication 1, information per STA is
included.
    AID info: indicates identification of STA.
    BA indication(2bits): identical to BA indication defined in FIG. 17.
    If (BA indication == 00) {
      Block ACK Starting Sequence Control & Block ACK bitmap
    } else if ((BA indication == 01) {
      Block ACK Starting Sequence Control
    }
}

Group ACK indication defined above may be configured as ACK/NACK type (2 bits).

TABLE 5

ACK/NACK type (2 bits)

00: indicates that frames have been successfully received from all STAs scheduled through resources allocated through All ACK Indication and a trigger frame. STAs can be limited to only the aforementioned STAs that have transmitted PPDUs for which ACK Policy == 00 is set.
01: indicates a case in which no frame has been received through resources allocated through All NACK Indication and a trigger frame.
10: ACK/BA Indication. This indicates ACK other than All ACK/NACK and is followed by an ACK/BA Information field. This can include ACK/BA for one or more STAs.
11: reserved In Table 5, "10" may also include information about which STA has BA information stored therein and the information may be represented in the form of an STA bitmap.

FIGS. 31 to 34 are diagrams for explaining BA information configurations when ACK/NACK type is represented by 10.

In an STA bitmap, bits indicate STAs in the order allocated by a trigger frame. For example, resources for STAs 1, 2, 4 and 5 are allocated by a trigger frame, and a 4-bit STA bitmap is configured, in which the first bit indicates STA 1, the second bit indicates STA 2, the third bit indicates STA 4 and the fourth bit indicates STA 5. Block ACK information (block ACK starting sequence control & block ACK bitmap) of STAs set to 1 in the bitmap is included in BA information.

As illustrated in FIG. 31, it is desirable that block ACK information (start block ACK starting sequence control & block ACK bitmap) be repeated by the number of STAs set to 1 in the bitmap.

Figure 32:
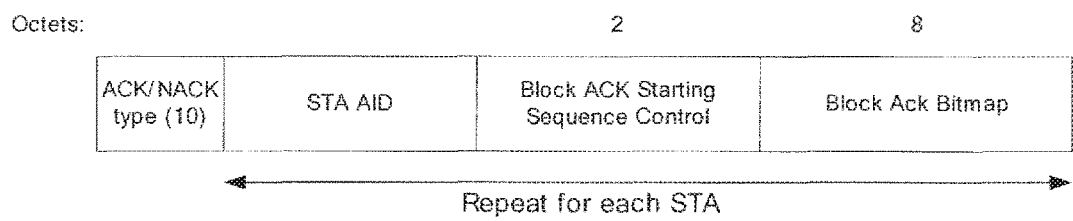

STA AID may be repeatedly included instead of the STA bitmap, and FIG. 32 illustrates an example of such configuration.

In FIG. 32, STA AID and block ACK information (start block ACK starting sequence control & block ACK bitmap) are repeated by the number of STAs set to 1 in the bitmap.

Figure 33:
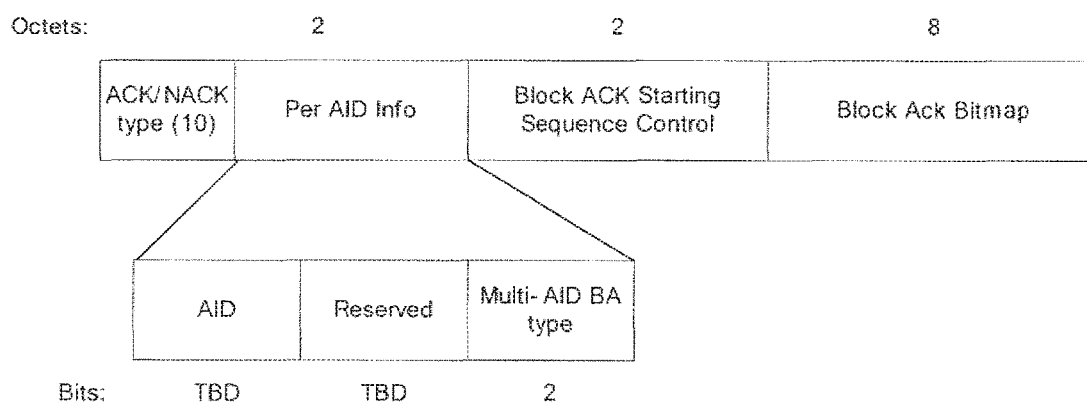
Figure 34:
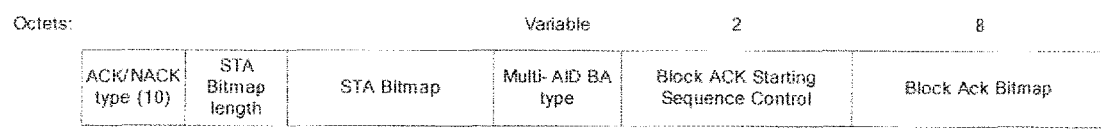

In this case, BA information may have a format including partial information, as illustrated in FIG. 33. That is, a block ACK starting sequence control field or a block ACK bitmap can be optionally included per AID or STA depending on a multi-AID BA type value. FIG. 34 illustrates an example of such a case.

Multi-AID BA type is included as 2 bits only for STAs set to 1 in the STA bitmap, and the block ACK starting sequence control field or block ACK bitmap can be optionally included per AID or STA depending on a multi-AID BA type value, as defined above.

Figure 35:
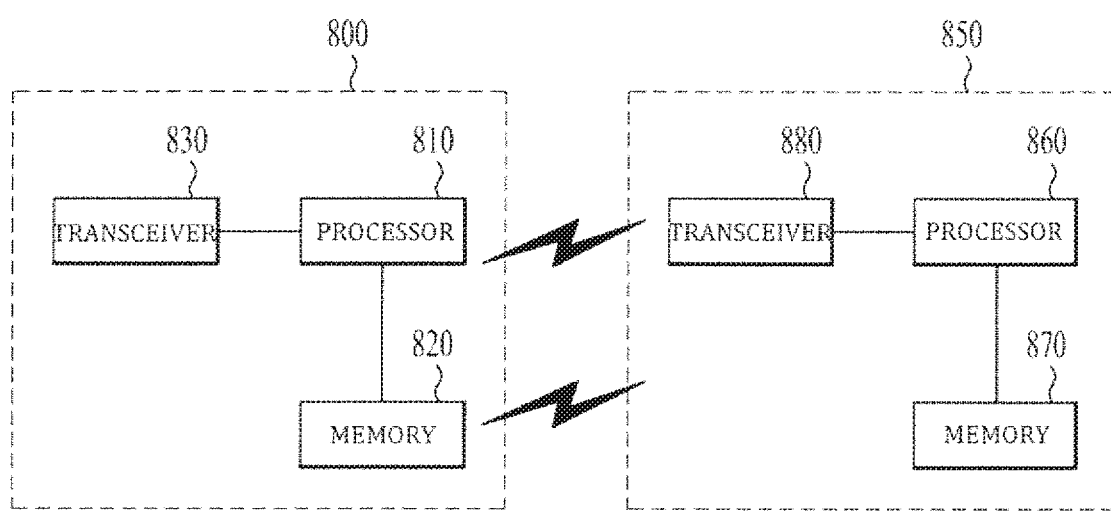
FIG. 35 is a diagram for explaining an apparatus for implementing a method according to the present invention.

FIG. 35 is a diagram for explaining an apparatus for implementing the above-described method.

A wireless apparatus 800 of FIG. 35 may correspond to the above-described STA and a wireless apparatus 850 of FIG. 35 may correspond to the above-described AP.

The STA 800 may include a processor 810, a memory 820, and a transceiver 830 and the AP 850 may include a processor 860, a memory 870, and a transceiver 860. The transceivers 830 and 880 may transmit/receive a wireless signal and may be implemented in a physical layer of IEEE 802.11/3GPP. The processors 810 and 860 are implemented in a physical layer and/or a MAC layer and are connected to the transceivers 830 and 880. The processors 810 and 860 may perform the above-described UL MU scheduling procedure.

The processors 810 and 860 and/or the transceivers 830 and 880 may include an Application-Specific Integrated Circuit (ASIC), a chipset, a logical circuit, and/or a data processor. The memories 820 and 870 may include a Read-Only Memory (ROM), a Random Access Memory (RAM), a flash memory, a memory card, a storage medium, and/or a storage unit. If an embodiment is performed by software, the above-described method may be executed in the form of a module (e.g., a process or a function) performing the above-described function. The module may be stored in the memories 820 and 870 and executed by the processors 810 and 860. The memories 820 and 870 may be located at the interior or exterior of the processors 810 and 860 and may be connected to the processors 810 and 860 via known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

While the various embodiments of the present invention have been described in the context of an IEEE 802.11 based WLAN system, the present invention is not applied thereto. The present invention is identically applicable to various WLAN systems in which an AP can perform a block ACK mechanism for a plurality of STAs.

What is claimed is:

1. A method of transmitting, by an access point (AP), an ACK/NACK signal for multiple data frames received from a plurality of stations (STAs) in a wireless local area network (WLAN) system, the method comprising:
  transmitting a trigger frame to the plurality of STAs;
  receiving the multiple data frames from the plurality of STAs in response to the trigger frame; and
  transmitting a single ACK frame for the ACK/NACK signal,
  wherein, when the single ACK frame includes an All ACK indication, the single ACK frame represents ACK for all the multiple data frames received from the plurality of STAs without information on successfully received data frames among the multiple data frames, and
  wherein, when the single ACK frame does not include the All ACK indication, the single ACK frame includes the information on successfully received data frames among the multiple data frames.

2. The method according to claim 1, wherein the single ACK frame including the All ACK indication represents successful reception of all the data frames received from one or more STAs for which an ACK policy has been set to a first value.

3. The method according to claim 1, wherein the single ACK frame has an NDP frame format.

4. A method of receiving, by a first station (STA), an ACK/NACK signal from an access point (AP) in a wireless local area network (WLAN) system, the method comprising:
  receiving a trigger frame transmitted to a plurality of STAs including the first STA;
  transmitting a plurality of data frames to the AP through an uplink multi-user scheme or an OFDMA scheme in response to the trigger frame; and receiving a single ACK frame from the AP, wherein, when the single ACK frame includes an All ACK indication, the single ACK frame represents ACK for all the plurality of data frames transmitted to the AP, without information on successfully received data frames among the plurality of data frames, and wherein, when the single ACK frame does not include the All ACK indication, the single ACK frame includes the information on successfully received data frames among the plurality of data frames.

5. An access point (AP) apparatus for transmitting an ACK/NACK signal for multiple data frames received from a plurality of stations (STAs) in a wireless local area network (WLAN) system, the apparatus comprising:

a transceiver configured to transmit a trigger frame to the plurality of STAs, to receive the multiple data frames from the plurality of STAs in response to the trigger frame and to transmit a single ACK frame for the ACK/NACK signal; and a processor connected to the transceiver and configured to process the trigger frame, the received multiple data frames and the ACK/NACK signal, wherein the processor is configured to transmit the single ACK frame including an All ACK indication to represent ACK for all the multiple data frames received from the plurality of STAs without information on successfully received data frames among the multiple data frames and wherein the processor is configured to transmit the single ACK frame not including the All ACK indication, but including the information on successfully received data frames among the multiple data frames to represent ACK for the successfully received data frames.

6. An apparatus operating as a first STA for receiving an ACK/NACK signal from an access point (AP) in a wireless local area network (WLAN) system, the apparatus comprising:

a transceiver configured to receive a trigger frame transmitted to a plurality of STAs including the first STA, to transmit a plurality of data frames to the AP through an uplink multi-user scheme or an OFDMA scheme in response to the trigger frame and to receive a single ACK frame from the AP; and a processor connected to the transceiver and configured to process the trigger frame, the plurality of data frames and the single ACK frame, wherein, when the single ACK frame includes an All ACK indication, the single ACK frame represents ACK for all the plurality of data frames transmitted to the AP without information on successfully received data frames among the plurality of data frames, and wherein, when the single ACK frame does not include the All ACK indication, the single ACK frame includes the information on successfully received data frames among the plurality of data frames.

* * * * *